May 7, 1968 R. B. BIGGINS 3,381,876
FOOD CONTAINER AND UTENSIL HOUSING
Filed Feb. 27, 1967 2 Sheets-Sheet 1
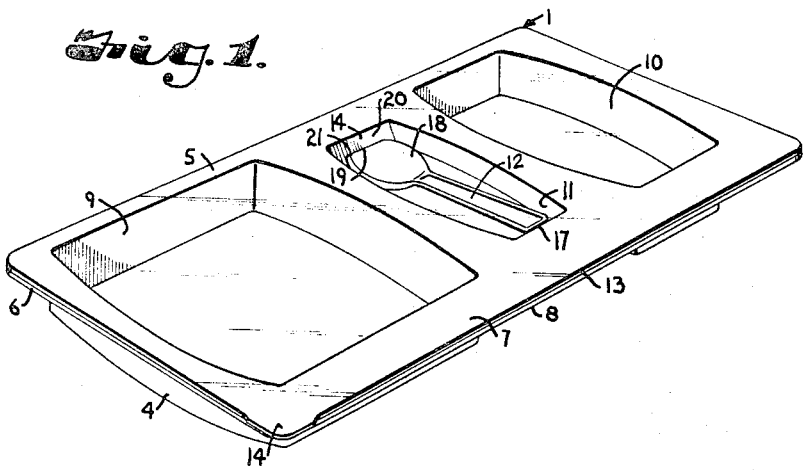
Fig. 1.
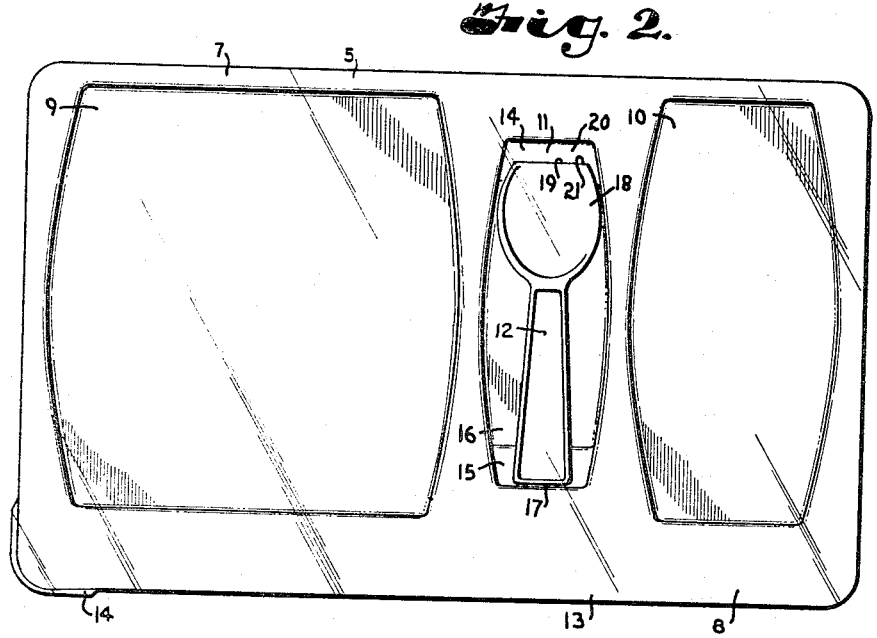
Fig. 2.
Fig. 3.
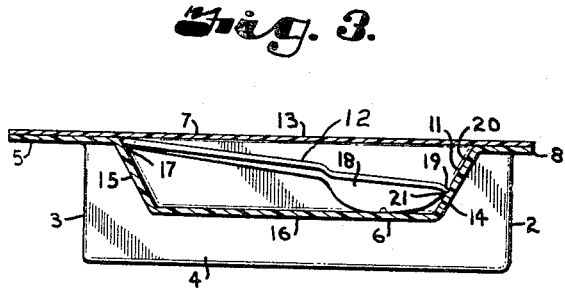
INVENTOR.
ROBERT B. BIGGINS
BY
ATTORNEYS May 7, 1968 R. B. BIGGINS 3,381,876
FOOD CONTAINER AND UTENSIL HOUSING
Filed Feb. 27, 1967 2 Sheets-Sheet 2
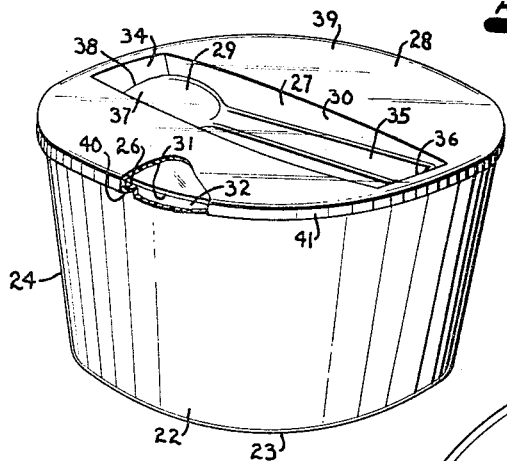
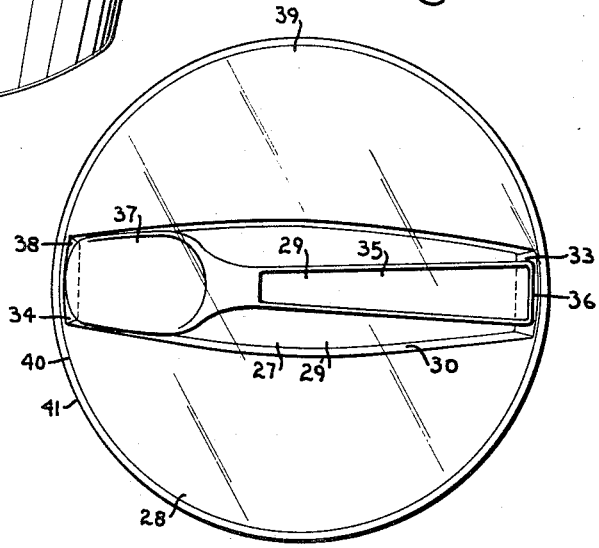
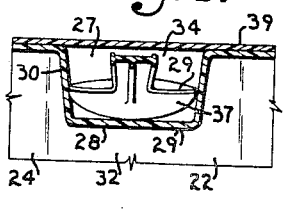
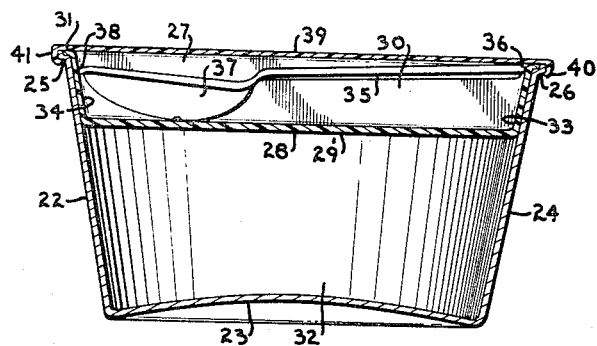
INVENTOR.
ROBERT B. BIGGINS
BY
ATTORNEYS

United States Patent Office 3,381,876
Patented May 7, 1968

3,381,876
FOOD CONTAINER AND UTENSIL HOUSING
Robert B. Biggins, Kansas City, Mo., assignor of one-half to Lillian E. O'Brien, Kansas City, Mo.
Filed Feb. 27, 1967, Ser. No. 618,676
2 Claims. (Cl. 229—1.5)

ABSTRACT OF THE DISCLOSURE

This disclosure embodies a food container for preserving the same in a sanitary condition, and including a housing as a part thereof for enclosing a utensil, such as a spoon, fork, or the like, until the container is opened and the food is to be eaten, using said utensil.

---

The present invention contemplates a container for food materials, particularly solids or semisolids, to be kept in a sanitary condition, either in a frozen or unfrozen ready-to-eat state, until the cover therefor is removed and the food is ready to be eaten by the consumer.

It also contemplates a container having a single compartment, as well as two compartments. It includes a housing in a cover for the container for a utensil with which the food is eaten, such as a spoon, fork, or the like.

Still further objects of the invention are to provide a container having side walls tapered outwardly from bottom to top and having an insert therein of plastic material, the insert being in the form of a housing or recessed compartment having flanges at the upper end engaging over the top wall of the container in which the utensil is to be contained, and a cover for the utensil. The utensil is of a length wherein the handle end will engage at the upper edge of the housing on one side and the spoon end of the utensil will engage against the housing at the other end by friction to retain the utensil therein and not move or rattle in the housing. The cover is of transparent plastic material and pressure sensitive to be retained over the edges of the top of the container.

Other objects of the present invention contemplate the provision of a container of a substantially rectangular shape, having side walls and compartments of different size for containing food, and a compartment or housing for the utensil between the two compartments for the food. The compartments are inset from the edges of the container, providing a shelf therearound and over which the cover of plastic material may be placed and secured thereto by a pressure sensitive material or other means, and to provide a device of the character described which is simple and economical to manufacture.

In accomplishing these and other objects of the invention hereinafter pointed out, I have provided improved structure, the preferred form of which is illustrated in the accompanying drawings, wherein:

FIG. 1 is a perspective view of a food container having two compartments with a housing for a utensil therebetween.

FIG. 2 is a top plan view of the container showing the cover thereon, with a pull tab for the cover to be removed.

FIG. 3 is a cross sectional view through the container, particularly illustrating the housing or compartment for the utensil.

FIG. 4 is a perspective view of a modified form of container.

FIG. 5 is a top plan view of the container of FIG. 4.

FIG. 6 is a cross sectional view through the container, particularly illustrating the utensil in its housing.

FIG. 7 is a fragmentary cross sectional view taken transversely through the housing for the utensil.

Referring more in detail to the drawings:

1 designates a body or housing for a container embodying the features of my invention, comprising side walls 2 and 3 and end walls 4. The container is here shown to be of substantially rectangular shape, although I do not wish to be limited to such shape. The walls 2, 3 and 4 of the container have overhanging or outwardly extending walls forming flanges as indicated at 5, 6 and 7. The body is here shown to be made of plastic, such as polyethylene, but may be made of semi-rigid paper, treated so that it will not absorb the moisture from the food, as is the usual practice. The container includes compartments 9 and 10 for food, formed by recessing the housing as shown in FIG. 1, and also includes a housing 11 for a utensil 12, such as a spoon. The housing 11 is placed between the compartments 9 and 10, as illustrated in FIGS. 1 and 2. After the food has been placed in the compartments 9 and 10, a sheet of transparent pressure-sensitive plastic material 13 is stretched over the food and housing to cover the food and the utensil. This provides a sanitary container for the food and the utensil, and the transparent cover 13 includes a pull tab 14 whereby, when the user desires to eat the food, the tab is grasped between the finger and thumb of the hand and removed therefrom, so that the utensil may be removed from its housing and the food consumed.

The housing 11 for the container has its end walls 14 and 15 tapered as illustrated in FIG. 3, from the bottom 16 toward the upper flange portion 8. The handle of the utensil engages the tapered wall 15 just under the plastic cover 13, as indicated at 17, and the spoon end 18 is pressed against the bottom and having its end 19 frictionally engaging the wall 20 of the inside of the housing, as indicated at 21, so that the spoon will be prevented from moving around in the housing during transportation.

In FIGS. 4, 5, 6 and 7, I have shown another form of the invention, comprising a container 22 having a bottom 23 and side walls 24 tapering outwardly from the bottom towards the open top, and the upper edge of the walls 24 are turned outwardly and upwardly, as indicated at 25 (FIG. 6), forming a shoulder 26 for supporting a cover member 27 and a housing 28 for a utensil 29. The housing 28 is formed as part of the cover member 27, preferably made of plastic, such as polyethylene or the like, and has an annular rim or edge 31 which engages the shoulder 26 of the inside walls 24. The housing or recess 28 is formed as part of the cover member 27 and has a bottom 29' and side walls 30 tapered outwardly from the bottom the same degree as the side walls 24 of the container.

As shown, the container 22 includes a compartment 32 for foodstuff, such as ice cream or other solid or semisolid food.

After the food (not shown) has been placed in the compartment 32, the cover member 27 with its housing 28 is placed in the container thereabove so that the rim 31 engages the shoulder 26 of the side walls of the container. The recess or housing portion 28 has tapered end walls 33 and 34, so that the utensil 29 will have the handle end 35 pressed against the tapered end wall 33 as indicated at 36, and the spoon end 37 against the wall 34, as indicated at 38, to frictionally retain the utensil in the housing, so that it will not move around therein and be displaced. A transparent cover 39 is placed over the container and has its edges turned downwardly, as indicated at 40, to engage under the outwardly flared portion 25 of the walls 24 of the container. The transparent cover may also be made of plastic material, such as polyethylene or the like, and is pressed around the rim 41 of the container to adhere thereto and retain the food of contamination. If desired, an adhesive (not shown) could be used to facilitate sticking of the edge of the cover to the rim.

It will be obvious from the foregoing that I have provided an improved container for food or the like wherein the food may be retained in a sanitary condition along with a utensil for consuming the food by the consumer, by removing a transparent cover therefrom placed thereover by pressure-sensitive material or an adhesive or the like which will not contaminate the foodstuffs.

While I have here indicated the walls of the container as being of cardboard treated for non-absorbing the moisture of the foodstuff and the cover of plastic material or the like, other material may be used without departing from the spirit of my invention.

It is to be understood that while I have illustrated and described two forms of my invention, it is not to be limited to the specific forms or arrangements of parts herein described and shown except insofar as such limitations are included in the claims.

What I claim and desire to secure by Letters Patent is:
1. A container and utensil for food comprising:
   (a) a first compartment having a circular bottom wall and a side wall, said side wall extending upwardly and outwardly from a periphery of said bottom wall, said side wall having an upper edge turned radially outwardly thereby forming a rim portion having an upper and lower surface, said side wall upper edge having a recessed portion defining a shoulder;
   (b) a cover member for said first compartment, said cover being transparent and having a second compartment housing said utensil and having a bottom wall and opposed end walls and opposed side walls, said second compartment side walls extending upwardly and outwardly from said second compartment bottom wall, said second compartment end walls being positioned to fit within annd engage said first compartment side walls, said second compartment side walls and end walls having an annular flange portion turned outwardly therefrom, said flange portion being received in said shoulder whereby said first compartment is sealed against contamination thereof;
   (c) said utensil having a handle and a food engaging portion, said handle being shaped at the end thereof to engage one of said second compartment end walls, said food engaging portion being shaped at the end thereof to engage the other of said second compartment end walls, said food engaging portion having sides shaped to engage opposed second compartment side walls for substantially the length of said food engaging portion, said food engaging portion having a bottom shaped and positioned to engage said second compartment of bottom wall when said handle end and said food engaging portion end and sides engage said second compartment end walls and side walls for frictionally retaining said utensil in said second compartment; and
   (d) a transparent covering for said container being shaped and adapted to have a peripheral edge turned downwardly and to engage said rim portion at said lower surface, said covering extending over said second compartment whereby said utensil in said second compartment is sealed against contamination thereof.

2. A transparent compartmentalized container and utensil for food comprising:
   (a) a housing having a plurality of compartments therein, one of said compartments being a utensil retaining compartment, said compartments each having a bottom wall and side walls and end walls, said side walls and said end walls extending upwardly from said bottom wall, said side walls and said end walls each having an upper edge, said housing having an upper flange portion joining said upper edge, said utensil retaining compartment end walls being planar and tapered downwardly and inwardly from said upper edge toward said utensil retaining compartment bottom wall;
   (b) a transparent covering adapted to be placed over said housing, said covering engaging said flange portion and having a pull tab extending beyond said flange portion; and
   (c) said utensil having a handle and a food engaging portion, said handle being shaped at the end thereof to engage one of said utensil compartment end walls adjacent said upper edge and to be engaged by said covering, said food engaging portion being shaped at the end thereof to engage the other of said utensil compartment end walls, said food engaging portion having sides shaped to engage opposed utensil compartment side walls for substantially the length of said food engaging portion, said food engaging portion having a bottom shaped and positioned to engage said utensil compartment bottom wall when said handle end and said food engaging portion end and sides engage said utensil compartment end and side walls whereby said covering cooperates with said utensil retaining compartment end and side walls to frictionally retain said utensil in said utensil retaining compartment until said covering is removed.

References Cited

UNITED STATES PATENTS

| | | | |
|---|---|---|---|
| 1,514,379 | 11/1924 | Fleischer | 206—47 |
| 2,878,128 | 3/1959 | Jorgenson. | |
| 3,083,821 | 4/1963 | Woodson | 206—47 |

DAVID M. BOCKENEK, *Primary Examiner.*